Figure 1:
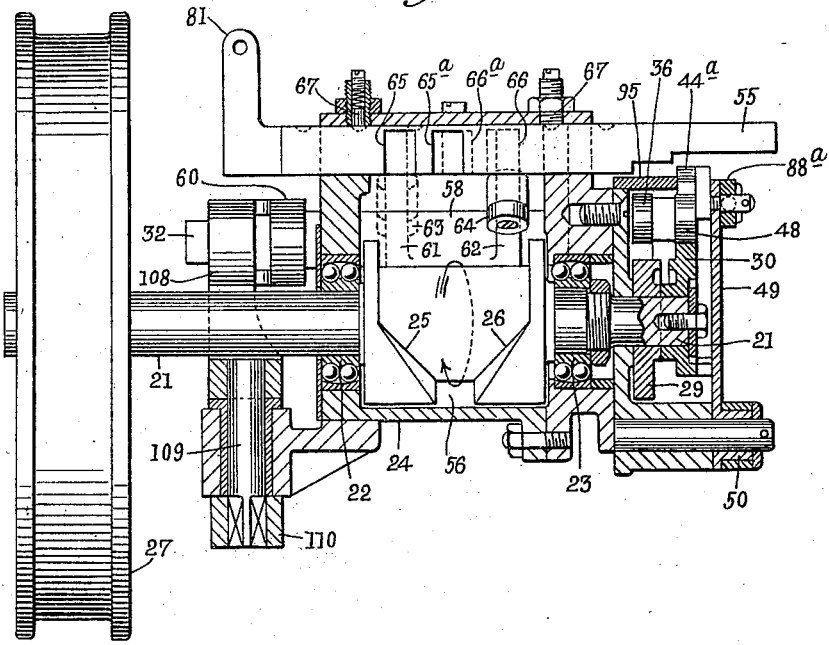

R. M. RUCK.
CHANGE SPEED GEAR.
APPLICATION FILED JAN. 19, 1918.

1,277,130.

Patented Aug. 27, 1918.
4 SHEETS—SHEET 1.

Witnesses
Henry Ruht
G. V. Rasmussen

Inventor
Richard Matthews Ruck
by Messer Schenck
Attorneys

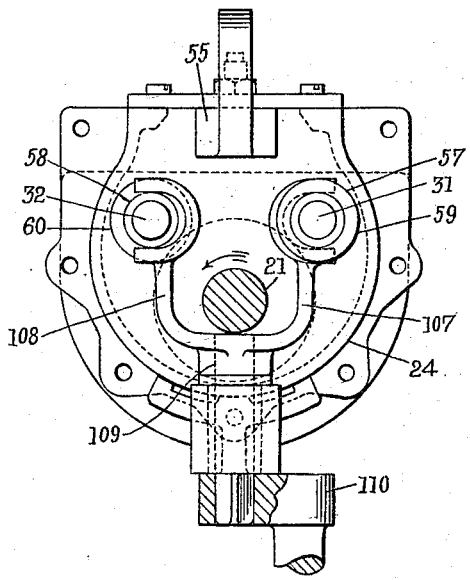
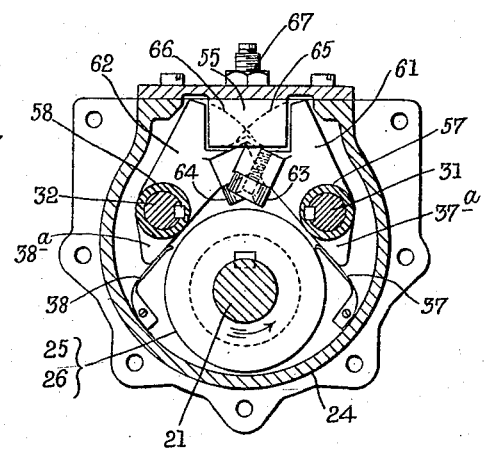
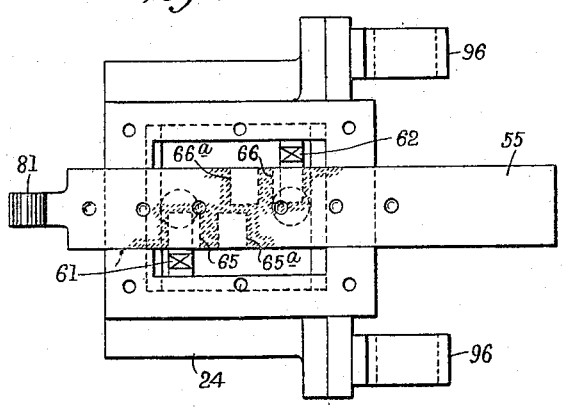

R. M. RUCK.
CHANGE SPEED GEAR.
APPLICATION FILED JAN. 19, 1918.

1,277,130.

Patented Aug. 27, 1918.
4 SHEETS—SHEET 3.

Witnesses
Henry Ruhl
G. V. Rasmussen

Inventor
Richard Matthews Ruck
by Messrs. Schrenk
Attorneys

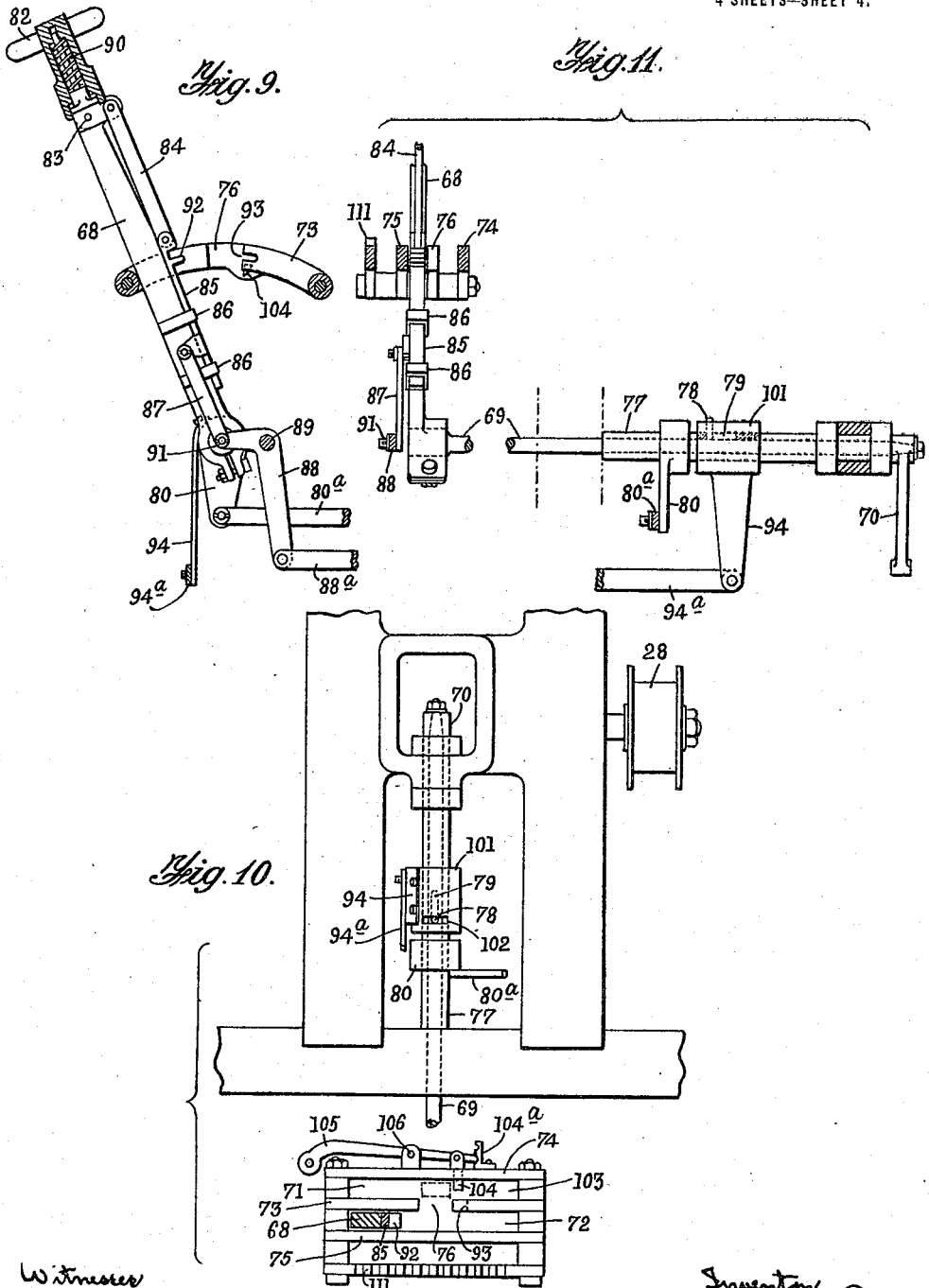

UNITED STATES PATENT OFFICE.

RICHARD MATTHEWS RUCK, OF SOUTH KENSINGTON, LONDON, ENGLAND.

CHANGE-SPEED GEAR.

1,277,130.  Specification of Letters Patent.  Patented Aug. 27, 1918.

Application filed January 19, 1918. Serial No. 212,773.

*To all whom it may concern:*

Be it known that I, RICHARD MATTHEWS RUCK, a subject of the King of Great Britain, and resident of 44 Thurloe Square, South Kensington, London, England, have invented a certain new and useful Improvement in or Relating to Change-Speed Gear, of which the following is a specification.

This invention relates to improvements in automatic controlling mechanism for power-operated change-speed gear of the kind which has a neutral position between engagements and is driven non-rigidly through a clutch from a prime-mover (such as the driving motor of an automobile) by means of voluntarily-controllable automatically-acting mechanism comprising a power-shaft rotated continuously irrespective of the position of said clutch, this clutch (hereinafter referred to as the driving-clutch) being controlled by the displaceable member of cam-mechanism driven by said power-shaft, which shaft also drives continuously both a timing-cam for controlling the change-speed gear, and also a locking-cam coacting with said timing-cam; all the cams revolving in a regularly recurrent cycle wherein each cam is so timed that the operations of the change-speed gear and of the driving-clutch respectively will be effected in proper coördination during a single cycle, while the arrangement is such that a change of gear, although capable of being initiated (by the release of a normally-locked element) at any moment, can actually commence only at the beginning of said cycle and, when once initiated, is automatically carried through to completion, whereupon those parts which come into active operation only during a change of gear are automatically restored to position in readiness for the initiation of a fresh change of gear.

In the specification of a patent granted to me, No. 1,179,659, controlling mechanism of the kind referred to was described, wherein the continuously-driven power-shaft, which carried all the above-mentioned cams, had splined upon it the displaceable member of the cam-mechanism for controlling the driving-clutch, and also had fast upon it a row of tappets equal in number to the several steps involved in all the changes of gear either upward or downward; two steps being required respectively for shifting the change-speed gear from any position of engagement to neutral position and thence either back to the original position or on to the next position of engagement. The tappets were adapted to act in succession upon either of two oppositely-inclined cam-blocks mounted in a slidable carrier connected with the displaceable element or elements of the change-speed gear, both cam-blocks being normally held out of operative position but each being alternatively capable of being brought, under the control of the selective locking-mechanism and the timing-mechanism, into position to be so acted upon by the tappets as to be caused to communicate motion to the carrier step-by-step in a direction corresponding to the inclination of the particular cam-block selected. The slidable carrier had a cam-groove or grooves adapted, by acting upon levers respectively connected to the several displaceable elements of the change-speed gear, to bring about in succession the various steps of shifting movement required in said gear; the only voluntary action necessary for carrying out any individual step, upward or downward, being the selective action involved in the release, by means of a single small hand-lever, of the appropriate one of a pair of locks controlled in common by the locking-cam and serving, normally, to prevent the coming into operation of the mechanism for automatically producing an upward or a downward change of gear.

The objects of the present invention are to simplify the construction of power-driven automatic controlling mechanism of the kind just described; to reduce materially its size, weight, and cost; to enable manual controlling-means of the "gate" type to be employed, in combination with said automatic controlling mechanism, for the purpose of selecting and initiating the changes of gear in cases where, as in ordinary automobile practice, more than two alternative speeds are provided; and to permit, when desired, all the operations incidental to a change of gear, including de-clutching and re-clutching, to be carried out non-automatically by usual means (such for example as gate controlling-mechanism for shifting the change-speed gear by hand, and pedal-operated mechanism for controlling the driving-clutch) without bringing into action the power-operated automatic controlling gear.

According to the present invention, the continuously-driven shaft (hereinafter referred to as the cam-shaft) serves to actuate, in addition to the timing cam and locking-cam as before, a pair of oppositely-inclined cams (hereinafter termed the main cams) whence are derived all the power-produced automatic movements required not only for effecting any step in a change of gear (i. e., a step from neutral position to a position of engagement above or below neutral, or vice versa), but also for concurrently controlling the driving-clutch. The respective main cams, which, together with the timing-cam and locking-cam, revolve continuously in a regularly recurrent cycle, are both normally ineffective, and are adapted to be put alternatively at will into operative connection with a slide (hereinafter referred to as the main slide) so as to cause the latter to be moved from normal position in one direction or the other through a distance corresponding to the distance between the neutral position and a position of engagement (above or below neutral) of any displaceable element (e. g. slidable pinion or clutch-member) of the change-speed gear; the connection between each main cam and the slide being established in such manner as to afford a lost-motion interval during which the operation of de-clutching is effected before the slide itself begins to move. The main slide is put into operative connection on the one hand with either of the main cams alternatively at will under the control of the timing-cam and locking-cam, and on the other hand (assuming provision to be made for more than two alternative speeds) with any desired displaceable element of the change-speed gear through the medium of suitable manual controlling-mechanism, for example of the "gate" type provided with usual selector-bar devices; the driving-clutch spring, which is put under stress as usual during the de-clutching operation, being utilized for effecting or assisting the return to normal position (on the completion by the power-driven controlling mechanism of each step in a complete change of gear) of the main slide and parts moved thereby.

The two locks already mentioned, which are releasable alternatively at will as before, serve, when not released, to hold the power-actuated portions of the controlling mechanism out of action throughout any step in a change of gear, and thus leave such step free to be carried out entirely by usual means, while provision is made for permitting in such case the actuation of the driving-clutch by usual means as well. Hence, if the engine should happen to be stopped when the change-speed gear is in a position of engagement, the change-speed gear can be brought to neutral position by hand independently of the rotation of the cam-shaft, or in other words independently of the running of the engine.

The accompanying drawings illustrate a convenient form of the invention as applied to automobile change-speed gear affording three speeds for forward running and one speed for reverse running, in conjunction with "gate" controlling-mechanism for shifting the change-speed gear by hand and with pedal-operated mechanism for controlling the driving-clutch.

Figure 2:
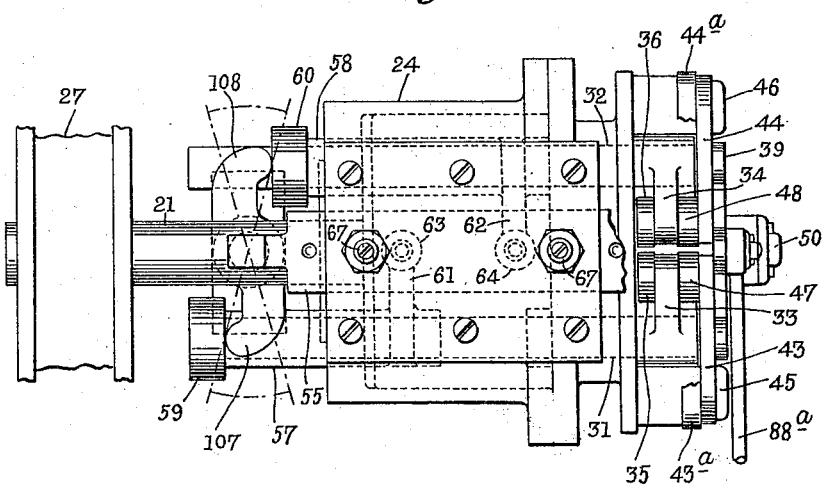
Figure 4:
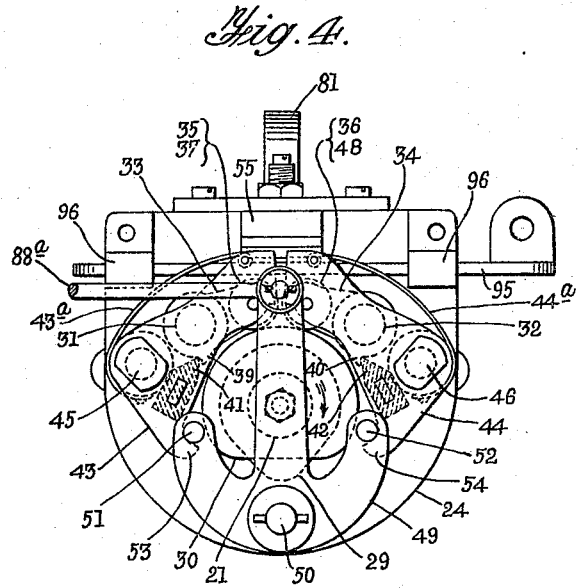
Figure 7:
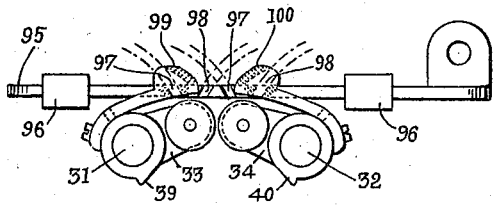
Figure 8:
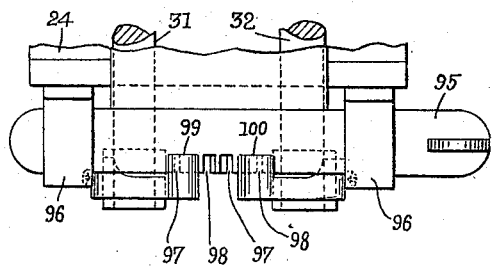

Figure 1 is a sectional side elevation of the automatic controlling mechanism; Fig. 2 is a plan view of the same; Fig. 3 is a part plan view showing a detail; and Fig. 4 is an end elevation viewed from the right hand side of Figs. 1 and 2. Fig. 5 is a transverse section taken substantially inside the left hand end of the casing, Fig. 1, and looking toward the right in said figure; while Fig. 6 is an elevation of the left hand end of Fig. 1. Figs. 7 and 8 are partial views, similar respectively to Figs. 1 and 2, showing a detail not fully illustrated in said figures. In all the foregoing figures portions of the mechanism are broken away or omitted, for the sake of clearness.

Fig. 9 is a part sectional outside elevation of a "gate" quadrant and hand-lever with the more immediately associated parts, as adapted for use with the present invention; Fig. 10 is a plan view of the same; and Fig. 11 is an elevation looking from the right hand side of Figs. 9 and 10. Figs. 9 to 11 are drawn to a smaller scale than that of Figs. 1 to 8, and show only so much as is necessary for illustrating the invention.

Similar reference symbols denote the same parts throughout the drawings.

21 is the cam-shaft already referred to, which extends horizontally through, and is journaled in ball-bearings 22, 23 at the respective ends of, a casing 24 which is bolted to the chassis of the vehicle and within which the main cams 25, 26 are keyed upon the shaft 21 side-by-side. Beyond the bearing 22, the shaft 21 has fast upon it a pulley 27 through which, so long as the engine is running, it is continuously rotated (with capability of slipping in the event of the resistance becoming excessive) by means of an endless belt which passes under a guide-pulley 28 (Fig. 10). Beyond the opposite end of the casing 24, the shaft 21 has fast upon it the timing cam 29 and the locking-cam 30, the associated parts of the timing and locking mechanism being fast upon the casing. It will be assumed hereinafter that this timing and locking mechanism is substantially similar to that set forth in the specification of my previous patent already referred to, but for the sake of clearness the construction illustrated in connection with the present invention will now be briefly described.

That is to say, above and parallel with, but on opposite sides of, the cam-shaft 21, a pair of rocking-shafts 31, 32 are journaled in bearings in the casing 24, these rocking-shafts having fast upon them, outside the casing and beyond the cam-shaft bearing 23, arms 33 and 34 carrying rollers 35 and 36 adapted to bear downward upon the timing-cam 29 under the stress of a spring 37 or 38 which bears against a short arm 37$^a$ or 38$^a$ fast on the shaft 31 or 32. Normally, however, both rocking-shafts 31 and 32 are held locked in such angular position as to prevent the rollers 35 and 36 from bearing constantly upon and responding to the changes of contour in the continually revolving cam 29; for which purpose nibs 39 and 40 on the arms 33 and 34 engage detents 41 and 42 carried by bell-crank locking-levers 43 and 44 which are fulcrumed to the casing at 45 and 46 and normally held raised by means of leaf-springs 43$^a$ and 44$^a$; the pressure of these springs being sufficient to retain the nibs 39 and 40 in engagement with their detents 41 and 42 and thus to hold both the arms 33 and 34, and also the locking-levers 43 and 44, in their respective normal or resting positions. The longer limbs of the locking-levers 43 and 44 carry rollers 47 and 48 and can be depressed, during part of the revolution of the locking-cam 30, so as to cause or permit said rollers to bear upon and follow the contour of the locking-cam. In order that either locking-lever 43 or 44 may at will be thus displaced, singly, from normal position, a three-armed lever 49, fulcrumed to the casing at 50 and adapted to be manually controlled, normally occupies a mid position (see Fig. 4) wherein pins 51 and 52 on its lateral limbs engage arms 53 and 54 on the locking-levers 43 and 44 in such manner that, on the three-armed lever 49 being displaced toward either side of its mid position, the corresponding pin 51 or 52 will act upon the arm 53 or 54 so as to disengage the detent 41 or 42 from the nib 39 or 40 and force down (in opposition to its spring 43$^a$ or 44$^a$) the roller 47 or 48 into contact with the locking-cam 30 when the latter occupies the appropriate angular position. At the same time the roller 35 or 36, being released, will be forced downward by its spring 37 or 38 into contact with the timing-cam 29 and produce a corresponding angular movement of its rocking-shaft 31 or 32; and thereafter, in consequence of the revolution of the shaft 21 and cams 29 and 30, that rocking-shaft 31 or 32 which was thus angularly displaced will be restored by the action of the timing-cam 29 to normal position, and that locking-lever 43 or 44 which was released will be restored by the action of the locking-cam 30 to normal position, so that, the nib 39 or 40 becoming re-engaged with the detent 41 or 42, all parts will be finally left locked in their normal or resting position.

Vertically above and parallel with the cam-shaft 21, a slide 55 (constituting what has already been referred to as the main slide) is fitted to reciprocate in guides in the casing 24 so as to be movable from a mid position to either of two extreme positions alternatively, such movement being due to the bringing into action, as just described, of one or other of the rocking-shafts 31 or 32, according as a step in the operation of gearing-up or of gearing-down is to be produced, when such step is to be effected automatically by power.

For this purpose each rocking-shaft 31 or 32 has splined upon it a sleeve 57 or 58 which extends through the rocking-shaft bearing at that end of the casing 24 which is remote from the cams 29 and 30, each sleeve having on its outer end a collar 59 or 60 hereinafter referred to, and having fast upon it, within the casing 24, a bell-crank lever 61 or 62 the lower limb of which carries a roller 63 or 64 adapted to be acted upon by the main cam 25 or 26 when the upper limb of the lever engages a notch in the adjacent side of the main slide 55. The slide 55 has two notches at each side; the notches 65 and 65$^a$ being adapted for engagement by the lever 61, while the notches 66 and 66$^a$ are adapted for engagement by the lever 62. The normal position of these notches relatively to the levers is best seen in Fig. 3, which shows the parts as they stand when the slide 55 has been left in mid position (corresponding to neutral gear); the lever 61 being capable of engaging the outer notch 65 on the one side of the slide, or the lever 62 capable of engaging the outer notch 66 on the other side of the slide, alternatively according as the slide 55 is to be moved (and the gear changed) in the one direction or the other.

If, now, it be required to shift the slide 55 toward the right in Figs. 1 and 3, the rocking-shaft 31 must first be unlocked (as already described), whereupon the lever 61 will be brought, by the pressure of its spring 37 and the consequent angular movement of the shaft 31, into position to engage the notch 65, the roller 63 being at the same time brought into position for engagement by the cam 25. As a result, during the next revolution of this cam, the lever 61 with its sleeve 57 will be shifted toward the right until its roller 63 is brought into the space 56 between the cams 25 and 26; this movement being communicated to the slide 55 and bringing the notch 66$^a$ into position for engagement by the lever 62 whenever it may be required to restore the slide to mid position. Similarly, if it be required to shift the slide 55 toward the left in Figs. 1 and 3, the rocking-shaft 32 must first be unlocked, whereupon the lever 62 will be brought, by the pressure of its spring 38 and the consequent angular movement of the shaft 32, into position to engage the notch 66, the roller 64 being at the same time brought into position to engage the cam 26. As a result, during the next revolution of this cam, the lever 62 with its sleeve 58 will be shifted toward the left until its roller 64 is brought into the space 56 between the cams 25 and 26; this movement being communicated to the slide 55 and bringing the notch 65$^a$ into position for engagement by the lever 61 whenever it may be required to restore the slide to mid position.

It will be seen that the operative faces of the main cams 25 and 26 are opposed to one another, while the levers 61, 62 and rollers 63, 64 are so disposed relatively to the respective cams as to be adapted to be moved by said cams, and thus to move the main slide 55, in opposite directions respectively, the minimum space 56 between the cams 25 and 26 being sufficient to give passage to the roller 63 or 64 when either of said rollers has been brought, by the action of the corresponding main cam, to the limit of its movement. It will further be understood that the main cam 25 is adapted to act only through the roller 63 upon the cam-lever 61, and always (when said lever is in operative position) moves the main slide 55 toward the right in Fig. 1; while the main cam 26 is adapted to act only through the roller 64 upon the cam-lever 62, and always (when said lever is in operative position) moves the main slide 55 toward the left in the same figure. Moreover, the contours and relative angular dispositions of the cams 25, 26, 29 and 30 (which all revolve as one) are such that, on the one hand, at whatever moment in the revolution of the cam-shaft 21 the lever 49 may be actuated to unlock either of the rocking-shafts 31 or 32, the cam-lever roller 63 or 64 can only descend into operative position when the appropriate part of the face of the main cam 25 or 26 is opposite said roller, and that, on the other hand, as soon as the roller 63 or 64 has been thus brought into operative position and the main cam 25 or 26 has thereafter shifted said roller into the space 56 between the cams, the rocking-shaft 31 or 32 will be automatically returned to its normal or resting angular position so as to withdraw the roller 63 or 64 out of the path of the main cam 25 or 26, whereupon the rocking-shaft 31 or 32 will become re-locked in normal position.

The notches 65, 65$^a$, and 66, 66$^a$ in the main slide 55 (see Fig. 3) are wider, lengthwise of said slide, than those limbs of the levers 61 and 62 which are adapted to engage the respective notches, so that each lever 61 or 62, with its sleeve 57 or 58, will, when engaged with the notch 65 or 66, be moved a predetermined distance along the corresponding rocking-shaft 31 or 32 before the main slide 55 is caused to participate in such movement. The purpose of this initial "lost motion" of each lever 61 and 62, with its sleeve 57 and 58, relatively to the main slide 55, will be explained hereinafter.

67 are spring-jumpers adapted, by engaging recesses in the main slide 55 in its several positions, to prevent accidental displacement of the slide when once brought to any particular position.

The "gate" hand-lever 68 (Figs. 9 to 11) for controlling the changes of gear, is fast on the outer end of a horizontal shaft 69 which is capable of being rocked about its axis and also of being slid lengthwise of said axis according as the lever 68, in effecting a change of gear, is moved only angularly, or both angularly and also laterally so as to pass through the "gate." The shaft 69 has fast upon its inner end an arm 70 adapted to coöperate as usual with selector-bars respectively appropriated to the several displaceable elements of the change-speed gear (not shown); it being understood that, in the example illustrated, a choice of three speeds in forward running and one speed in reverse running are available. The gate-quadrant illustrated has accordingly two parallel slots 71 and 72 separated by a bar 73 and bounded externally by bars 74 and 75, the middle bar 73 having a "gate" 76 to give passage to the lever 68 when necessary.

The shaft 69 extends through a sleeve 77, which is capable of rocking about its axis as one with the shaft but is prevented from sliding lengthwise; and a pin 78, which is fixed in the shaft 69, projects therefrom through a longitudinal slot 79 provided in the sleeve 77, so as to cause the shaft and sleeve to participate in angular movement alone. An arm 80 fast upon the sleeve 77 is coupled by a link 80$^a$ (or equivalent connection) to the main slide 55 at 81, so that on the one hand, if the slide 55 be engaged by the cam-lever 61 or 62 so as to be moved automatically in one direction or the other as already described, its movement will cause the sleeve 77 and therefore the gate hand-lever 68 to rock in the corresponding direction, whereas on the other hand, if neither of the cam-levers 61, 62 be engaged with the slide 55, angular movement imparted manually to the gate hand-lever 68 in either direction will be transmitted to the slide 55 and will cause the latter to move in the corresponding direction. Obviously, lateral movement of the lever 68 through the gate 76 will produce no effect on the main slide 55, the pin 78 then sliding lengthwise of the slot 79.

The actuation of the three-armed lever 49, so as to effect the release of one or other of the locking-levers 43, 44 before the movement of the gate hand-lever 68 as a whole commences and the main slide 55 is set in motion, is insured by the following means. That is to say, the upper or handle end 82 of the lever 68 is pivoted at 83 to the main portion of the lever so as to be capable of rocking in either direction, from a mid position, through a small angle in the plane of movement of the lever as a whole, and is coupled by a link 84 to a rod 85 fitted to slide in guides 86 on the lever; the lower end of this rod being coupled by a link 87 to one arm of a bell-crank lever 88 which is fulcrumed at 89 at a fixed point and of which the other arm is coupled by a link 88$^a$ or other suitable connection to the long central arm of the three-armed lever 49. The handle 82 of the lever 68 is normally held in alinement with the main portion of the lever by means of a spring 90, and when in such normal position of alinement, the joint 91 whereat the link 87 is coupled to the bell-crank lever 88 coincides axially with the shaft 69, so that movement of the main portion of the lever 68 will not disturb the lever 88 unless or until the handle 82 be displaced. Hence by grasping the lever 68 by its main portion only, the driver can operate the change-speed gear manually in the usual manner, but without bringing the automatic mechanism into action; whereas, if the driver actuates the lever 68 by means of its handle 82, he will first bring the automatic mechanism into operation and will then, by continued movement of the hand-lever 68, determine the gear to be used, the rest of the operation being performed by the automatic mechanism.

When the gate hand-lever 68 is to be passed laterally through the gate 76, the handle 82 must not be moved relatively to the main portion of the lever 68 until the latter has passed through the gate; the reason being that the particular gear, up or down, which is to be used cannot be finally selected mechanically, until the hand-lever 68 has passed through the gate 76. Hence, when the lever 68 is to be passed through the gate, it should be initially brought opposite the gate by being grasped only at a point below the handle 82; but in order to prevent accident in the event of this precaution being neglected and of the hand-lever 68 being passed through the gate after the release, by means of the handle 82, of either locking-lever 43 or 44, the rod 85 has a nib 92 adapted to register with and pass through a notch 93 in the middle bar 73 of the gate-quadrant only when the handle 82 is in its normal or mid angular position relatively to the main portion of the lever 68, and otherwies to obstruct lateral movement of the lever 68 through the gate. As a further measure of precaution whereby to prevent the coming into operation of either rocking-shaft 31 or 32 in the event of the release of either locking-lever 43 or 44 during the passage of the gate hand-lever 68 through the gate 76, an arm 94 adapted to slide, but not to turn, as one with the shaft 69, is coupled to what may be termed a locking-plate 95 (Figs. 4, 7 and 8) fitted to reciprocate in guides 96 immediately above the rocking-shafts 31, 32 and their arms 33, 34 and rollers 35, 36; the locking-plate 95 having notches in two pairs 97, 97 and 98, 98 which, only when the plate 95 is at one or the other limit of its travel, register with and give passage to nibs 99 and 100 carried respectively by the arms 33 and 34, so that only when the hand-lever 68 has passed completely through the gate 76 into either slot 71 or 72 of the gate-quadrant can the roller 35 or 36 descend into operative contact with the timing-cam 29. The arm 94 is attached to a socket 101 which embraces the sleeve 77 so as to be slidable over the sleeve while permitting the sleeve to turn inside the socket, the latter having a circumferential slot 102 in which the outer end of the pin 78 engages, so that longitudinal movement of the shaft 69, due to the hand-lever 68 passing through the gate 76, will be imparted to the socket 101 and arm 94 and transmitted thence to the locking-plate 95 by a link 94$^a$ or equivalent connection, whereas rotary movement of the shaft 69 and sleeve 77, due to the hand-lever 68 being angularly displaced, will produce no effect on the arm 94 and locking-plate 95.

The right-hand end 103 of the slot 71 of the gate-quadrant is to be understood as the position of the hand-lever 68 corresponding to reverse running, and in order to prevent accidental movement of the lever 68 to this position, a removable stop 104 is provided which obstructs the passage of the lever toward the end 103 of the slot 71 except when said stop is deliberately withdrawn. For this purpose the stop 104 is constituted by a pin projecting into the slot 71 through a hole in the bar 74, this pin being pivotally attached to one end of a small hand-lever 105 fulcrumed to the gate-quadrant at 106 and provided with a jumper-spring device as at 104$^a$ for holding the lever 105 in position either to present the stop 104 in, or to withdraw it from, the path of the lever 68. The stop 104 is further adapted, by engaging beneath the nib 92, to prevent accidental movement of the handle 82 angularly toward the right in Fig. 9, with reference to the lever 68, and consequent release of the locking-mechanism and premature initiation of a reversal of the gear, when the lever 68 is in mid position in the quadrant slot 71, as for example immediately after said lever has passed into the slot in question through the gate 76.

The object of providing a lost-motion interval at the commencement of each sliding movement (produced by the action of the main cam 25 or 26) of either of the cam-lever sleeves 57 or 58, before the main slide 55 begins to move from its mid or normal position, is to enable the sliding movement of the sleeve to effect the disengagement of the driving-clutch before the main slide effects the shifting of the gear. It is necessary that the driving-clutch should always be thus disengaged, whichever cam-lever sleeve may be in operation, and, as the respective sleeves 57 and 58 are moved by the corresponding main cams 25 and 26 in opposite directions, a construction is provided whereby these movements, although themselves oppositely directed, are made to displace the clutch-lever (not shown) in only one direction, i. e., the direction for disengaging the displaceable member of the clutch in opposition to the stress of the usual clutch-spring.

For this purpose the collars 59 and 60 on the outer ends of the cam-lever sleeves 57 and 58 bear from opposite directions against the lateral arms 107 and 108 of a T-shaped or Y-shaped lever fast on a vertical spindle 109 adapted to oscillate about its axis, which intersects the axis of the cam-shaft, the spindle 109 having fast upon it a crank-arm 110 coupled by a link (not shown) to the clutch-lever, so that by whichever sleeve 57 or 58 the T-shaped lever 107, 108 is displaced from normal position, the clutch will be disengaged before the shifting of the change-speed gear can commence. When, on the conclusion of a change of gear (or of any step therein), that rocking-shaft 31 or 32 which has been turned to bring a cam-lever 61 or 62 into operative position is returned by the timing-mechanism to normal position, the consequent disengagement of the cam-lever both from its cam 25 or 26 and also from the main slide 55 releases said sleeve to the action of the clutch-spring, thereby causing the sleeve to be restored to normal position by the turning of the T-shaped lever 107, 108, which at the same time permits the clutch to become reëngaged by means of the clutch-spring.

When the gear is shifted manually, the de-clutching operation is permitted by the fact that the T-shaped lever 107, 108 is then free to oscillate away from the collars 59 and 60 on the cam-lever sleeves, to which therefore no motion is imparted.

111 is the usual ratchet-quadrant for the brake-lever (not shown) which is assumed to be mounted alongside of the gate hand-lever 68.

The invention can be readily applied to existing automobiles which have "gate" controlling-mechanism and the usual clutch-pedal, little alteration being required in order to adapt the existing mechanism to the requirements of the invention. The whole of the power-driven automatic controlling-mechanism of the present invention as hereinbefore described is so compact as to occupy only a very limited space which is not subject to increase with any increase in the number of speed-changes controlled. The mechanism can therefore be readily fixed upon an automobile in such position as to permit of the necessary connections with the existing mechanism being conveniently made.

I claim:

1. The combination of a power-operated change-speed gear, a driving clutch whereby motion is transmitted to the change speed gear, a power shaft rotatable continuously irrespective of the position of said driving clutch, mechanism operatively connected with said clutch and with said change-speed gear, a locking cam and a timing cam for said mechanism, both of said cams being actuated by said power shaft and a pair of cams arranged in opposed relation to each other and also actuated by said shaft for operating said mechanism to effect any step in a change of gear and to concurrently control the clutch.

2. The combination of a power-operated change-speed gear including a displaceable element, a driving clutch whereby motion is transmitted to the change-speed gear, a power shaft rotatable continuously irrespective of the position of said driving clutch, a slide operatively connected with said displaceable element of said change-speed gear, a locking cam actuated by said power-shaft, a timing cam actuated thereby, oppositely inclined, normally ineffective, main cams operatively connected with said power shaft, and means controlled by said locking and timing cams whereby said main cams are alternatively and selectively placed in operative connection with said slide to cause the latter to be moved from normal position in one direction or the other through a distance corresponding to the distance between the neutral position and a position of engagement of said displaceable element for effecting a step in a change of gear.

3. The combination of a power-operated change-speed gear including a displaceable element, a driving clutch whereby motion is transmitted to the change-speed gear, a power shaft rotatable continuously irrespective of the position of said driving clutch, a slide operatively connected with said displaceable element of said change-speed gear, a locking cam actuated by said power-shaft, a timing cam actuated thereby, oppositely-inclined, normally ineffective, main cams operatively connected with said power shaft, means operatively connected with said driving clutch and controlled by said locking and timing cams whereby said main cams are alternately and selectively placed in operative connection with said slide to cause the latter to be moved from normal position in one direction or the other through a distance corresponding to the distance between the neutral position and a position of engagement of said displaceable element for effecting a step in a change of gear, said means being capable of an initial movement independently of said slide whereby said driving clutch is disengaged before said slide begins its movement.

4. The combination of a power-operated change-speed gear, a driving clutch whereby motion is transmitted to said change-speed gear, a continuously rotatable power shaft, a locking cam fast upon said power shaft, a timing cam fast upon said shaft, two main cams carried thereby, a pair of rock shafts parallel to said power shaft, spring-pressed arms carried by said rock shafts and adapted to bear alternatively upon said timing cam, spring-pressed locking levers adapted to engage said locking cam and to normally maintain the rock shaft arms out of operative engagement with the timing cam, means for disengaging either of said locking levers from the corresponding rock shaft arm at will, guiding means, a slide movable therein parallel to the power shaft and connected with the change-speed gear, and a pair of levers slidably carried by the respective rock shafts and each adapted, when the rock shaft arm upon the corresponding rock shaft is in operative engagement with the timing cam, to be brought into coöperative relation with one of said main cams and into operative connection with said slide whereby each slidable lever is moved lengthwise of its rock shaft and said slide is slidably actuated to effect a step in a change of gear, said main cams being individually adapted to move the respective levers and the slide in opposite directions.

5. The combination of a power-operated change-speed gear, a driving clutch whereby motion is transmitted to said change-speed gear, a continuously rotatable power shaft, a locking cam fast upon said power shaft, a timing cam fast upon said shaft, two main cams carried thereby, a pair of rock shafts parallel to said power shaft, spring-pressed arms carried by said rock shafts and adapted to bear alternatively upon said timing cam, spring-pressed locking levers adapted to engage said locking cam and to normally maintain the rock shaft arms out of operative engagement with the timing cam, means for disengaging either of said locking levers from the corresponding rock shaft arm at will, guiding means, a slide movable therein parallel to the power shaft and connected with the change-speed gear, said slide being provided with notches, a pair of levers slidably carried by the respective rock shafts and operatively connected with said driving clutch, said levers being each adapted, when the rock shaft arm upon the corresponding rock shaft is in operative engagement with the timing cam, to be brought into coöperative relation with one of said main cams and to enter a notch in said slide whereby the latter is operatively connected with said lever, said notches being relatively wider than the co-acting end of the slidable lever whereby the latter is initially moved lengthwise of its rock shaft independently of said slide and continuing is subsequently moved to impart a sliding movement to said slide whereby a step in a change of gear is effected.

6. The combination of a power-operated change-speed gear, a driving clutch whereby motion is transmitted to said change-speed gear, a continuously rotatable power shaft, a locking cam fast upon said power shaft, a timing cam fast upon said shaft, two main cams carried thereby, a pair of rock shafts parallel to said power shaft, spring-pressed arms carried by said rock shafts and adapted to bear alternatively upon said timing cam, spring-pressed locking levers adapted to engage said locking cam and to normally maintain the rock shaft arms out of operative engagement with the timing cam, means for disengaging either of said locking levers from the corresponding rock shaft arm at will, guiding means, a slide movable therein parallel to the power shaft and connected with the change-speed gear, said slide being provided with notches, a hand lever for manually operating the driving clutch, a pair of levers slidably carried by the respective rock shafts and operatively connected with said hand lever, said levers being each adapted, when the rock shaft arm upon the corresponding rock shaft is in operative engagement with the timing cam, to be brought into coöperative relation with one of said main cams and to enter a notch of said slide whereby the latter is operatively connected with said slidable lever, said notches being relatively wider than the co-acting end of the lever whereby the latter is given an initial movement lengthwise of its rock shaft independently of said slide to disengage the clutch without interfering with the hand lever mechanism for controlling said clutch at will and continuing is given a subsequent movement to slidably move said slide to effect a step in a change of gear.

7. The combination of a power-operated change-speed gear, a driving clutch whereby motion is transmitted to said change-speed gear, a continuously rotatable power shaft, a locking cam fast upon said power shaft, a timing cam fast upon said shaft, two main cams carried thereby, a pair of rock shafts parallel to said power shaft, spring-pressed arms carried by said rock shafts and adapted to bear alternatively upon said timing cam, spring-pressed locking levers adapted to engage said locking cam and to normally maintain the rock shaft arms out of operative engagement with the timing cam, means for disengaging either of said locking levers from the corresponding rock shaft arm at will, guiding means, a slide movable therein parallel to the power shaft, means carried by the respective rock shafts and controlled by said rock shaft arms and the timing cam whereby said slide is operatively connected with one or the other of said main cams, gate mechanism for manually controlling said change-speed gear and including a hand lever connected with said slide whereby said change-speed gear is automatically actuated, and mechanism carried by said gate hand lever whereby, when said lever is automatically actuated to effect a change of gear, the corresponding locking lever will be disengaged from the coöperating rock shaft arm before said gate hand lever as a whole begins to move.

8. The combination of a power-operated change-speed gear, a driving clutch whereby motion is transmitted to said change-speed gear, a continuously rotatable power shaft, a locking cam fast upon said power shaft, a timing cam fast upon said shaft, two main cams carried thereby, a pair of rock shafts parallel to said power shaft, spring-pressed arms carried by said rock shafts and adapted to bear alternatively upon said timing cam, spring-pressed locking levers adapted to engage said locking cam and to normally maintain the rock shaft arms out of operative engagement with the timing cam, means for disengaging either of said locking levers from the corresponding rock shaft arm at will, guiding means, a slide movable therein parallel to the power shaft, means carried by the respective rock shafts and controlled by said rock shaft arms and the timing cam whereby said slide is operatively connected with one or the other of said main cams, gate mechanism for manually controlling said change-speed gear and including a hand lever, capable of angular and lateral movements, and a connection between said gate hand lever and said slide whereby any angular movement of the former produces a sliding movement of the slide and any sliding movement of said slide causes an angular movement of said gate hand lever, said connection permitting a lateral movement of said hand lever without effect upon said slide.

RICHARD MATTHEWS RUCK.

Copies of this patent may be obtained for five cents each, by addressing the "Commissioner of Patents, Washington, D. C."